United States Patent
Varona

[11] 3,724,444
[45] Apr. 3, 1973

[54] PORTABLE FIRE POT FOR SOLDERING IRON

[76] Inventor: Paulino G. Varona, 5535 Saint Rock Avenue, New Orleans, La. 70112

[22] Filed: Dec. 28, 1970

[21] Appl. No.: 101,663

[52] U.S. Cl. .................................. 126/237, 431/344
[51] Int. Cl. ............................................... F24c 3/00
[58] Field of Search ............... 126/237, 38; 431/344

[56] References Cited

UNITED STATES PATENTS

| 1,024,320 | 4/1912 | Eisenberg | 126/237 |
| 2,861,562 | 11/1958 | Ross et al. | 126/38 |
| 1,088,230 | 2/1914 | Johnson | 126/237 |

*Primary Examiner*—William F. O'Dea
*Assistant Examiner*—Peter D. Ferguson
*Attorney*—C. Emmett Pugh

[57] ABSTRACT

A soldering iron furnace which is light in weight so as to be readily portable, in which the degrees of heat generated is subject to manual control, which provides for rapid and economical heating of the soldering irons, and which confines the flame so as to be safe for use in areas selected for soldering; a dual fuel supply with a common T-joint connection is provided thereby adding much flexibility to the refill timing and allowing use of the device while one-half of the fuel supply is being replenished.

4 Claims, 3 Drawing Figures

INVENTOR:

PAULINO G. VARONA

INVENTOR:
PAULINO G. VARONA

BY:
ATTORNEY

PORTABLE FIRE POT FOR SOLDERING IRON

BACKGROUND OF THE INVENTION

The present invention relates to improvements in soldering iron furnaces or fire-pots for heating soldering irons and more particularly to furnaces or fire-pots which are readily portable and compact, easily refillable with fuel, and economically and rapidly heated; and particularly relates to those fire-pots which use pressurized combustible gases such as liquified petroleium gases (L.P.G.) as a fuel.

A contract to perform an on the site sheet metal construction job will necessarily require a soldering specialist, usually called by Union classification a "Sheet Metal Worker," to perform the needed soldering functions such as the soldering of seams of sheet metal roofs. The art of soldering two separate metals together with a metal of lesser melting point requires a large quantity of heat in order to bring the area on the two metals to be joined to the melting point of the soldering metal and add the latent heat of the transition of state to the soldering. Although the supplying of heat could theoretically be accomplished by other sources of heat energy, i.e., electricity, the sheet metal worker has consistently used the combustible fuel heated iron furnace to heat manual or hand-held soldering irons. Hand-held soldering irons allow much greater control and flexibility and their use is much more economical.

Most of the portable soldering iron furnaces or fire-pots in use today are charcoal fired furnaces, that is one using charcoal as the fuel source. However, such furnaces are very troublesome and involve such problems as the difficulties in lighting the charcoal, keeping it lighted for the desired period of time and at the desired temperature or heat rating, and upon completion of a job, the putting out and disposing of the hot coals.

Because of the problems associated with charcoal furnaces, other fuel source approaches have been considered such as gasoline (note for example U.S. Pat. No. 942,245, to E. T. Burgess, issued Dec. 7, 1909) or gas (note for example U.S. Pat. No. 1,024,320, to R. Eisenberg, issued Apr. 23, 1912; U.S. Pat. No. 1,401,514, to J. Blake, issued Dec. 27, 1921; U.S. Pat. No. 1,497,104, to E. H. Lamb, issued June 10, 1924) or a standard blow torch (note U.S. Pat. No. 1,432,801, to M. V. Streit, issued Oct. 24, 1922). However all of these types of furnaces likewise proved to be inadequate and failed to solve the problems of the prior art. In particular, they were clumsy to use or were not really portable or compact. Indeed most sheet metal workers today use the charcoal type furnace as the lesser of the evils.

Thus, until the present invention, there was no truly satisfactory fire-pot for heating soldering irons in the field available to the industry, i.e., one which was truly portable, compact, stable and lightweight and yet had no substantial problems with sufficient fuel reserve or fuel replenishment. In contrast, the physical characteristics of the fire-pot of the present invention achieve these desirable characteristics.

By using a L.P.G. fuel source and dual fuel supply system, the fire-pot of the present invention provides in effect a spare fuel tank and allows continuous use of the fire-pot even while the spent fuel tank is being replaced or replenished.

It is thus a basic object of the present invention to provide a soldering iron furnace or fire-pot which is light in weight so as to be readily portable, in which the degree of heat generated is subject to manual control, which provides for rapid and economical heating of the soldering irons, and which confines the flame so as to be safe for use in areas selected for soldering. It is further a basic object to provide a fuel system for the fire-pot which allows adequate fuel reserve as well as continuous use while a portion of the fuel supply is being replaced or replenished, thus allowing constant use without fuel supply being a problem.

Other objects and advantages of the present invention and a full understanding thereof may be had by referring to the following description and claims taken together with the accompanying drawings, briefly described below.

DESCRIPTION OF THE PREFERRED EMBODIMENT

Figure 1:
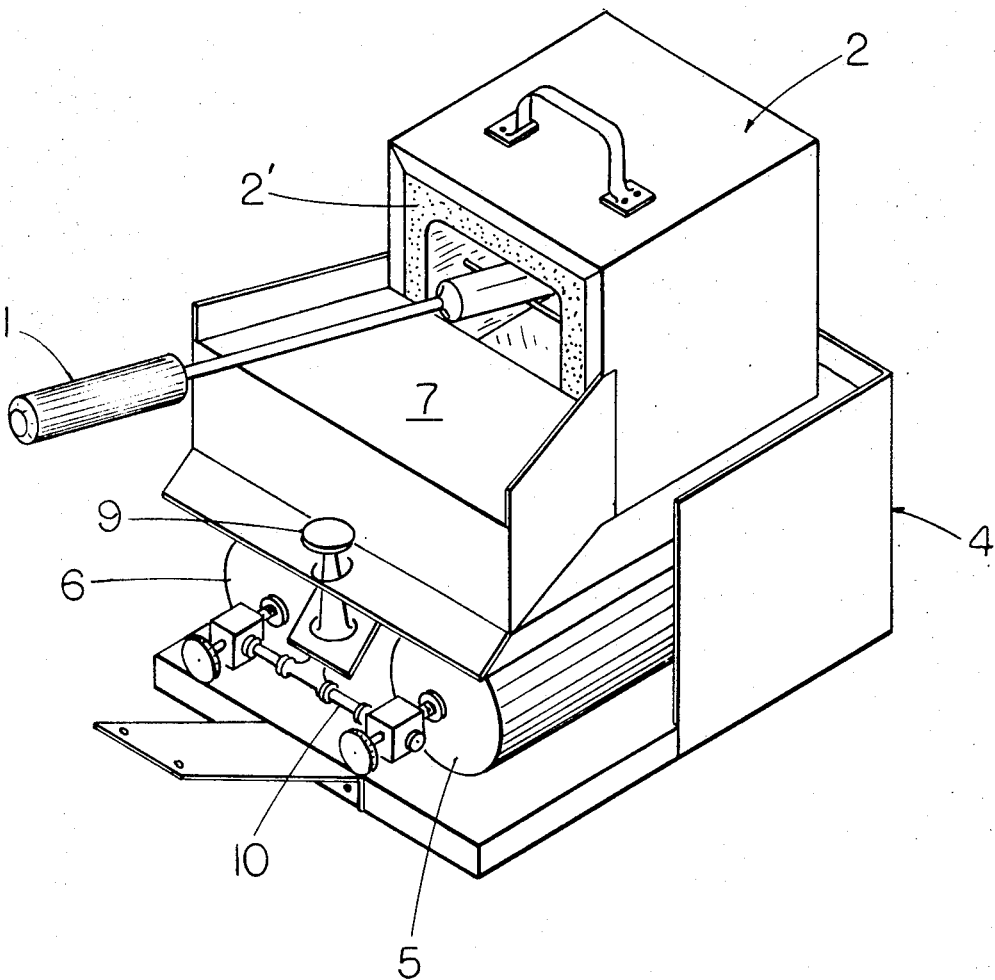
FIG. 1 is a perspective view of the soldering iron furnace or fire-pot of the present invention, with a front portion of the housing swung out for access to the internal "plumbing" of the fuel system of the furnace.
Figure 3:
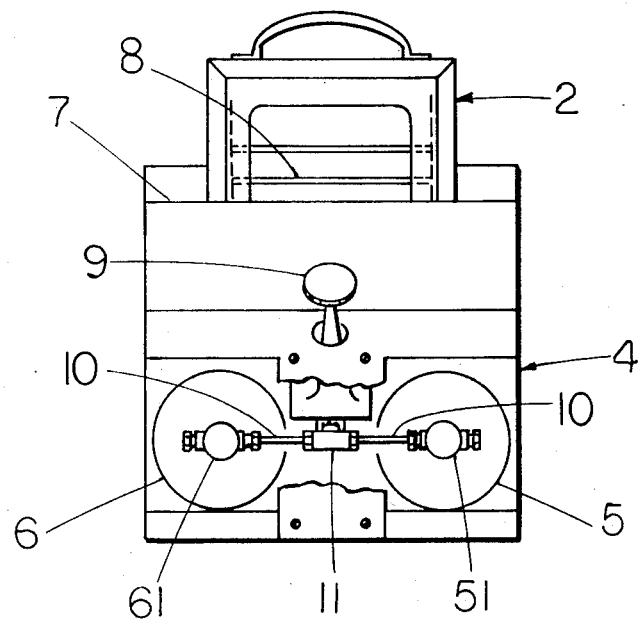
" and FIG. 3 is a front view of the fire-pot with the front portion partially cut away, exposing the internal "plumbing."
Figure 2:
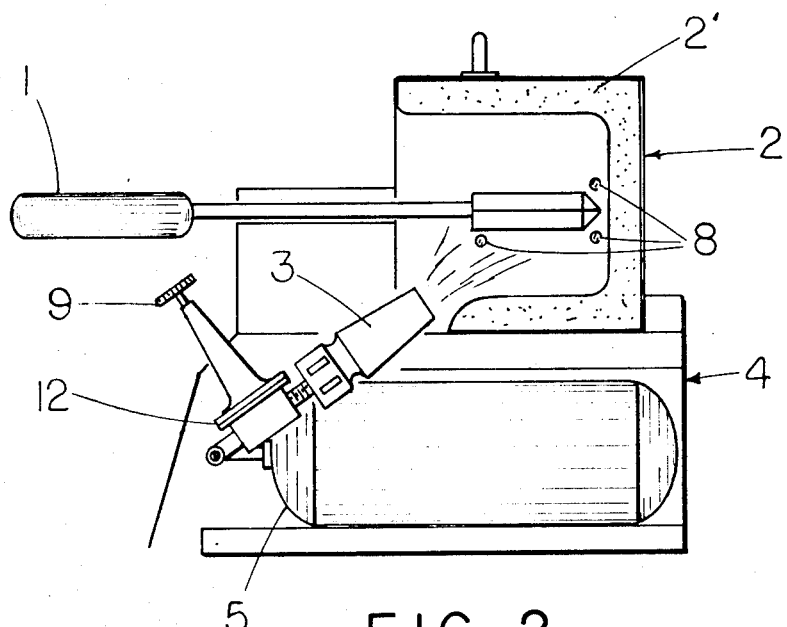
FIG. 2 is a side, cross-sectional view of the fire-pot, showing its internal structure, with the front portion swung out from its upper "hinge.

The preferred embodiment of the soldering iron heating furnace or fire-pot of the present invention, having a soldering iron being heated therein, is shown in FIGS. 1 – 3.

As illustrated in FIGS. 1 – 3, the compact, portable, statically balanced, sheet metal housing structure 4 houses two fuel cell tanks 5, 6 and an insulated fire box 2, and provides a support tray 7 for the iron(s) 1. The sheet metal of the housing can be made of 0.032 aluminum sheet metal for lightness without sacrificing durability or strength. The housing 4 is quite compact and measures approximately 14 inches in length, 10 inches in height and 9 inches in width.

The fuel cell tanks 5, 6 are standard tanks containing liquid petroleum gas (L.P.G.) and are 4 inches in diameter and 9 inches long. The tanks 5, 6 are connected to a common tubing header 10 and T-joint 11 from which a regulator valve 9 feeds an open nozzle burner 3 (note FIG. 2). The fuel cells 5, 6, header 10 and regulator 9 although easily accessible are fitted into the aluminum structure 4 so that the desired objectives of portability and ease of use are achieved.

The fuel cell tanks 5, 6 are fabricated from 0.25 steel and have been pressure tested to meet the standards of the national standards for pressure vessels. The normal operating pressure in the tanks 5, 6 is 45 pounds per square inch.

The fuel tanks 5, 6 are stored and held parallel and in side-by-side relationship in the bottom of the furnace for compactness and stability, the latter being due to the resultant low center of gravity of the furnace.

The cells 5, 6 are equipped with positive shut off valves 51 and 61 such that the individual tanks can be isolated from the flow of gas to the burner 3. The positive shut off valves 51, 61 are interconnected to a centrally located T-joint 11. This T-joint 11 serves two functions; first it connects cell 5 and cell 6 to burner 3, and second it contains a positive shut off internal needle valve that is activated on high differential pressure between the two cells 5, 6.

The second function of this T-joint/valve connection is one of the more important aspects of this invention for it is this mechanism which allows the flexibility in the timing of the refilling operations. Should one fuel tank all be used up and the fire from burner 3 goes out, the operator simply shuts off the cell being used, opens up the cell on standby, and re-lights the burner. Depending upon how fast the fuel is being consumed, the operator will have from 6 to 12 hours of continuous operation before he is completely out of fuel. With this knowledge the operator can arrange for a refilling of the empty cell at his convenience without disrupting the soldering job.

Should the operator desire to have the empty cell refilled immediately by his apprentices, this is also possible without disrupting the soldering job. The procedure is as follows. The cell is connected to the T-joint/valve 11 by the conventional tubing header 10 which is easily disconnected with the proper size pipe wrench. The connection is broken very slowly to insure a good positive shut off on the needle valve within the connection 11. The valve is activated by the high differential pressure between the fuel cell and atmospheric pressure sensed when the connection between the T-joint 11 and the empty cell is broken or undone.

The spent tank or cell can then be replaced or refilled. At most job sites, a storage tank of L.P.G., having a much larger capacity than the tanks 5, 6, is kept and can be used for refilling at the operator's s convenience.

In order to allow easy access to the internal "plumbing" of the fire-pot, namely to header 10 and T-joint 11, the front portion of the sheet metal housing is removable and could be hinged from either the top (as indicated in FIG. 2) or the bottom (note FIG. 1).

The regulator 9, which is located between the T-joint 11 and the open burner 3, is conveniently placed for manual control of the flame's intensity and also to maintain a constant flame regardless of the pressure remaining in the particular fuel cell being used, and can serve as a shut-off valve.

The open burner 3 is directed into an insulated enclosure 2 which is an integral part of the structure 4 and consists of an outer skin made of 0.032 aluminum sheet metal and insulated with a self-adhesive asbestos cement 2'. The direction of the flame is such that it will engulf the tip of a soldering iron resting on the support members 8 located in the interior of the insulated enclosure 2. The handle of the soldering iron is supported by the shelf 7 likewise constructed from 0.032 aluminum sheet metal and also forming an integral part of the total housing 4.

The operation of the furnace is initiated simply by inserting a match into the enclosure 2 and turning the regulator valve 9 on slightly until the flame is kindled. By manual adjustments of the regulator valve 9 the flame can be set at the desired level. For greater convenience in lighting the burner 3, the fire box 2 could be secured to the rest of the housing by means of a hinged connection to thereby allow it to be opened up for easier access to the burner.

Because the invention is capable of many different embodiments and of being practiced and carried out in various ways, it should be understood that the invention is not limited in its application to the details and arrangement of parts illustrated in the accompanying drawings. It should also be understood that the phraseology or terminology employed herein is merely for the purpose of description and not of limitation, and it is not intended to limit the invention claimed herein beyond the requirements of the prior art.

What is claimed for invention is:

1. A portable, fully self-contained heating furnace for heating soldering irons and the like comprising a housing having at least two section means connected together, an insulated fire box section means having a gas burner therein for heating the tips of soldering irons placed therein and a fuel section means for supplying fuel to said burner; said fuel section means being located below and separate from said fire box section means and having storage compartment means therein for temporary storing and holding two fuel tanks, said fuel tanks being elongated in shape and, when stored in said fuel section means and the furnace used, being placed horizontally in side-by-side, parallel relationship in the bottom part of said fuel section means, providing a relatively low center-of-gravity for the furnace during use giving it great stability; said gas fuel section means including a common header connection located adjacent to one end of where said two fuel tanks are stored for connection between said fuel tanks, said common header connection including a T-joint, the two opposed junctions of which go to said two fuel tanks and the third junction of which goes to said burner, a burner connection member connected between said header and said burner and valve means connected between said burner connection member and the connection for said tanks for permitting gas flow from either of said tanks to said burner, whereby when the fuel supply in one of said tanks is exhausted the other tank can be used as a source of fuel for said burner and said exhausted tank can be easily removed for fuel replenishment or replacement.

2. The furnace of claim 1 wherein said housing is "L-shaped" with the upper located fire box section means forming the boot of the "L" and the bottom located fuel section means forming the stem of the "L," the two horizontally disposed, elongated fuel tanks occupying the great bulk of said fuel section means when stored in said fuel section means, said housing being substantially open to the exterior at both the end and the end sides of said fuel section means at the end wherein said common header connection is located to provide easy access to inner part of the fuel section means where said fuel tanks are stored and to the two opposed junctions of said T-joint; whereby the fuel tanks can be easily removed or inserted and disconnected or connected.

3. The furnace of claim 1 wherein said fuel tanks are standard tanks for L.P.G.

4. The furnace of claim 1 wherein said firebox section means is removably attached to said gas fuel sections means to allow easy access to said burner.

* * * * *